(12) United States Patent
Sisto et al.

(10) Patent No.: US 8,041,874 B2
(45) Date of Patent: Oct. 18, 2011

(54) USB AND ETHERNET CONTROLLER COMBINATION DEVICE

(75) Inventors: John F. Sisto, Hauppauge, NY (US); Charles Forni, Setauket, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 87 days.

(21) Appl. No.: 12/369,571

(22) Filed: Feb. 11, 2009

(65) Prior Publication Data

US 2010/0036992 A1 Feb. 11, 2010

Related U.S. Application Data

(60) Provisional application No. 61/087,242, filed on Aug. 8, 2008.

(51) Int. Cl.
*G06F 13/00* (2006.01)
(52) U.S. Cl. .................. 710/315; 713/500; 713/600
(58) Field of Classification Search .................. 710/315, 710/110, 119, 120, 242, 243, 306, 317; 713/400, 713/500, 501, 600
See application file for complete search history.

(56) References Cited

U.S. PATENT DOCUMENTS

| | | | |
|---|---|---|---|
| 6,370,603 B1 * | 4/2002 | Silverman et al. | 710/72 |
| 2004/0071159 A1 | 4/2004 | Douglas et al. | |
| 2007/0016714 A1 | 1/2007 | Huotari et al. | |
| 2009/0175283 A1 * | 7/2009 | Jan et al. | 370/401 |

OTHER PUBLICATIONS

PCT/US2009/052424 Search Report and Written Opinion; dated Oct. 1, 2009; 12 pages.
"IEEE 802.3-2008 Specification—Part 3: Carrier sense multiple access with Collision Detection (CSMA/CD) Access Method and Physical Layer"; Dec. 26, 2008; 2,977 pages.
"Universal Serial Bus Specification, Revision 2.0"; Compaq, Hewlett-Packard, Intel, Lucent, Microsoft, NEC, Philips; Apr. 27, 2000; 650 pages.
"LAN9500/LAN9500i—Hi-Speed USB 2.0 to 10/100 Ethernet Controller Datasheet"; Standard Microsystems Corporation; Dec. 17, 2008; 43 pages.
"USB2514—USB 2.0 High-Speed 4-Port Hub Controller Datasheet"; Standard Microsystems Corporation; May 8, 2007; 46 pages.
"USB2601/USB2602—4th Generation USB2.0 Flash Media Controller with Integrated Card Power FETs and HS Hub Datasheet"; Standard Microsystems Corporation; Jul. 24, 2006; 26 pages.

* cited by examiner

*Primary Examiner* — Glenn A Auve
(74) *Attorney, Agent, or Firm* — Meyertons Hood Kivlin Kowert & Goetzel, P.C.; Jeffrey C. Hood

(57) ABSTRACT

A USB-to-Ethernet controller with a USB hub may be integrated into a single integrated circuit (IC) USB-Ethernet Combination (UEC) device. The UEC may provide the end user with an Ethernet port, multiple downstream USB ports, and an upstream USB port for connecting to a USB host controller. One or more of the USB hub ports may be brought off the IC, enabling an end user to connect them to any arbitrary USB device(s). The third hub port may be an internal downstream port without a physical layer, and may be configured to connect to an Ethernet controller, which may comprise a USB device controller. The Ethernet controller may connect to the internal downstream port via a digital interface such as UTMI. The UEC device may appear to the host computer as two separate devices, an Ethernet controller and a USB hub. The Ethernet controller may appear as a permanently attached device on the internal downstream port.

52 Claims, 3 Drawing Sheets

USB AND ETHERNET CONTROLLER COMBINATION DEVICE

PRIORITY CLAIM

This application claims benefit of priority of provisional application Ser. No. 61/087,242 titled "USB and Ethernet Controller Combination Device", filed on Aug. 8, 2008, whose inventors are John F. Sisto and Charles Forni, and which is hereby incorporated by reference in its entirety as though fully and completely set forth herein.

BACKGROUND OF THE INVENTION

1. Field of the Invention

This invention relates generally to computer networking and, more particularly, to the design of a combination USB (Universal Serial Bus)/Ethernet controller device.

2. Description of the Related Art

Various interface standards for connecting computers and external peripherals are in wide use today, each aiming to provide simple connectivity at high speeds. Examples of such standards include the IEEE (Institute of Electrical and Electronics Engineers) 1394 standard also referred to as FireWire, and the Universal Serial Bus (USB), both high-speed serial bus protocols. The most widely used networking standard for connecting computers in both Local Area Networks (LANs) and Wide Area Networks (WANs) has been the Ethernet protocol. More specifically, Ethernet is the IEEE 802.3 series standard, originally based on the Carrier Sense Multiple Access with Collision Detection (CSMA/CD) method that provided a means for two or more computer stations to share a common cabling system. CSMA/CD has formed the basis for Ethernet systems that reached transfer speeds in the megabit range, that is the Mbit/sec range. Recent switched based and/or router based Ethernet systems are capable of supporting transfer rates in the Gbit/sec range. Ethernet generally makes efficient use of shared resources, is typically easy to reconfigure and maintain, and provides compatibility across many manufacturers and systems, while keeping the cost low.

The Ethernet defines a number of wiring and signaling standards for the physical layer (PHY), through means of network access at the Media Access Control (MAC)/Data Link Layer, and through a common addressing format. Above the PHY, Ethernet enabled devices typically communicate by transmitting data packets, which comprise blocks of data that are individually sent and delivered. As with other IEEE 802 LANs, each Ethernet station is given a single 48-bit MAC address, which is used both to specify the destination and the source of each data packet. The MAC data communication protocol sub-layer is a sub-layer of the data link layer specified in the seven-layer OSI (Open System Interconnect) model (layer 2), and acts as an interface between the Logical Link Control (LLC) sub-layer and the network's physical layer. It emulates a full-duplex logical communication channel in a multipoint network to provide addressing and channel access control mechanisms that make it possible for several terminals or network nodes to communicate within a multipoint network, typically a LAN or a WAN.

The Universal Serial Bus (USB) was developed to offer PC users an enhanced and easy-to-use interface for connecting an incredibly diverse range of peripherals to their computers. The development of the USB was initially driven by considerations for laptop computers, which greatly benefit from a small profile peripheral connector. Among the many benefits of the USB is a reduction in the proliferation of cables that can affect even the smallest computer installations. In general, USB has become the interface of choice for PCs because it offers users simple connectivity. USB eliminates the need to have different connectors for printers, keyboards, mice, and other peripherals, and supports a wide variety of data types, from slow mouse inputs to digitized audio and compressed video. In addition, USB devices are hot pluggable, i.e. they can be connected to or disconnected from a PC without requiring the PC to be powered off.

The USB specification has seen various revisions, with the USB 2.0 standard challenging the IEEE 1394 interface ("Firewire") as the interface of choice for high-speed digital video, among others. With the proliferating design of increasingly smarter, faster, and smaller peripherals, the On-The-Go (OTG) Supplement to the USB 2.0 Specification was developed to address the growing popularity of the portable electronic devices market. Some of the advantages of the USB and OTG include the built-in support in form of more than 1.4 billion USB enabled PCs and peripherals shipped worldwide, smooth and trouble-free experience for the user through a compliance and logo program operated by the USB-IF, a wide variety of USB solutions such as intellectual property (IP) blocks, system-on-chip (SOC) parts, discrete chips, software drivers and systems offered by a large group of industry vendors, and design flexibility based on system needs.

OTG devices typically do not require a PC host, and can communicate directly with each other. For example, a PDA may act as a USB host with the capability to print directly to a USB printer, while also acting as a USB peripheral to communicate with a PC. In general, designers are facing increasing pressure to design smaller and faster products in less time and at lower cost. Concurrently, the introduction of smaller deep sub-micron processes present new challenges, such as integrating the physical layer (PHY—transceiver) analog circuitry required by technologies such as USB and OTG, leading to increased man-hours, fiscal and time investment, and silicon revisions. One way to increase time-to-market while keeping costs low is to provide the PHY in a separate chip. In such a case the designer can typically integrate most of the USB digital logic into the application specific integrated circuit (ASIC) in a small amount of time, and connect to a proven external PHY already available on the market.

Following the release of the USB 2.0 specification, Intel released the USB 2.0 Transceiver Macrocell Interface (UTMI) specification. UTMI defined an interface between two IP blocks, the USB Transceiver Macrocell (IP) and the USB Link layer (SIE). For example, the UTMI can be used to interface between a USB Link and a USB PHY. The signals for a UTMI interface with an 8-bit bi-directional data bus. Typically a minimum of 22 signals is required between the Link and the PHY for a device.

Subsequently, an extension of the original UTMI specification the UTMI+ specification was developed to meet the emerging need of building embedded host and OTG capabilities into USB devices. While the original UTMI specified an interface not meant to couple discrete ICs, the UTMI+ in essence introduced host and On-The-Go capabilities to USB systems. Using UTMI as a starting point, UTMI+ incrementally adds new functionality and interface signals to the Link and PHY. The additional signals total 33 for a full OTG UTMI+ interface. Designers can reuse all blocks from their original UTMI IP, and need only add the new circuits required for host or OTG support. This approach works well for UTMI+, as USB peripherals need only a subset of host and OTG functionality. UTMI+ introduced four levels of functionality, each higher level increasing the complexity required in both hardware and software while remaining completely backward compatible with lower levels.

A Low Pin Interface (LPI) UTMI+ specification, referred to as ULPI, was developed by USB industry leaders in order to provide low-cost USB and OTG PHYs by way of a low-pin, low-cost, small form-factor transceiver interface that may be used by any USB application. Pre-existing specifications, including UTMI and UTMI+ were developed primarily for Macrocell development, and were thus not optimized for use as an external PHY. Building upon the existing UTMI+ specification, the ULPI reduces the number of interface signals to 12 pins, with an optional implementation of 8 pins. As a result, the package size of PHY and Link IC's has generally been reduced, not only lowering the cost of Link and PHY IC's, but also reducing the required size of the associated printed circuit boards (PCBs). Central to the ULPI specification is the LPI, which is in effect a generic bus that defines a clock, three control signals, a bi-directional data bus, and bus arbitration. Typically, a ULPI link will configure the ULPI PHY using register writes on a bi-directional shared data bus. The ULPI PHY is the arbitrator of the 8-bit data bus between the link and the PHY.

Many consumer electronic devices have a USB port. In many instances, however, no Ethernet port is provided on the device, even though the end user may desire such functionality. This is prevalent for products such as game consoles and ultra thin laptops. In such cases, the end user typically has to attach an USB-to-Ethernet controller to one of the available USB ports in order to provide Ethernet functionality to the device. When Ethernet functionality for such devices is desired, it would be more practical to provide Ethernet functionality without having to use up one of a limited number of USB ports. Many solutions to this problem today include an integrated USB hub IC (integrated circuit) and Ethernet controller IC on a single device. Most such solutions are not cost effective and consume considerable power. There is therefore a need for a smaller form factor device, which would consume less power, would be more compact, and would be more convenient for the end user.

Other corresponding issues related to the prior art will become apparent to one skilled in the art after comparing such prior art with the present invention as described herein.

SUMMARY OF THE INVENTION

In one set of embodiments, a USB-to-Ethernet controller with a USB hub may be integrated into a single integrated circuit (IC) USB-Ethernet Combination (UEC) device. Embodiments of the UEC may provide the end user with an Ethernet port, multiple downstream USB ports, and an upstream USB port for connecting to a USB host controller. In one embodiment, one or more of the USB hub ports may be brought off the IC, enabling an end user to connect them to any arbitrary USB device(s) and/or functions. At least one of the hub ports may be configured as an internal downstream port without a physical layer (PHY) to connect to an Ethernet controller, which may be configured with a USB device controller to manage data traffic between the USB hub and the Media Access Control (MAC) portion of the Ethernet Controller. The Ethernet controller may connect to the internal downstream port of the USB hub via a digital interface such as a USB Transceiver Macrocell Interface UTMI. The UEC device may appear to the host computer as two separate devices, an Ethernet controller and a USB hub. The Ethernet controller may appear to the host controller as a permanently attached device on a specified port, in this case the internal downstream port of the USB hub.

In one set of embodiments, as part of the UEC device, an upstream USB PHY (physical layer), a plurality of downstream USB PHYs, and an Ethernet PHY may be configured on the same IC. Additionally, a PLL and voltage regulators may also be configured on the IC, to allow for significant reduction of the bill of materials (BOM). In order to further optimize the UEC device, the respective PLLs (phase locked loops) required by the USB PHY and Ethernet PHY may both also be integrated on the IC, and may share the same crystal oscillator. In alternate embodiments, a single PLL may be used to generate the respective clock signals for all components within the IC, with the single PLL using a single crystal oscillator.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
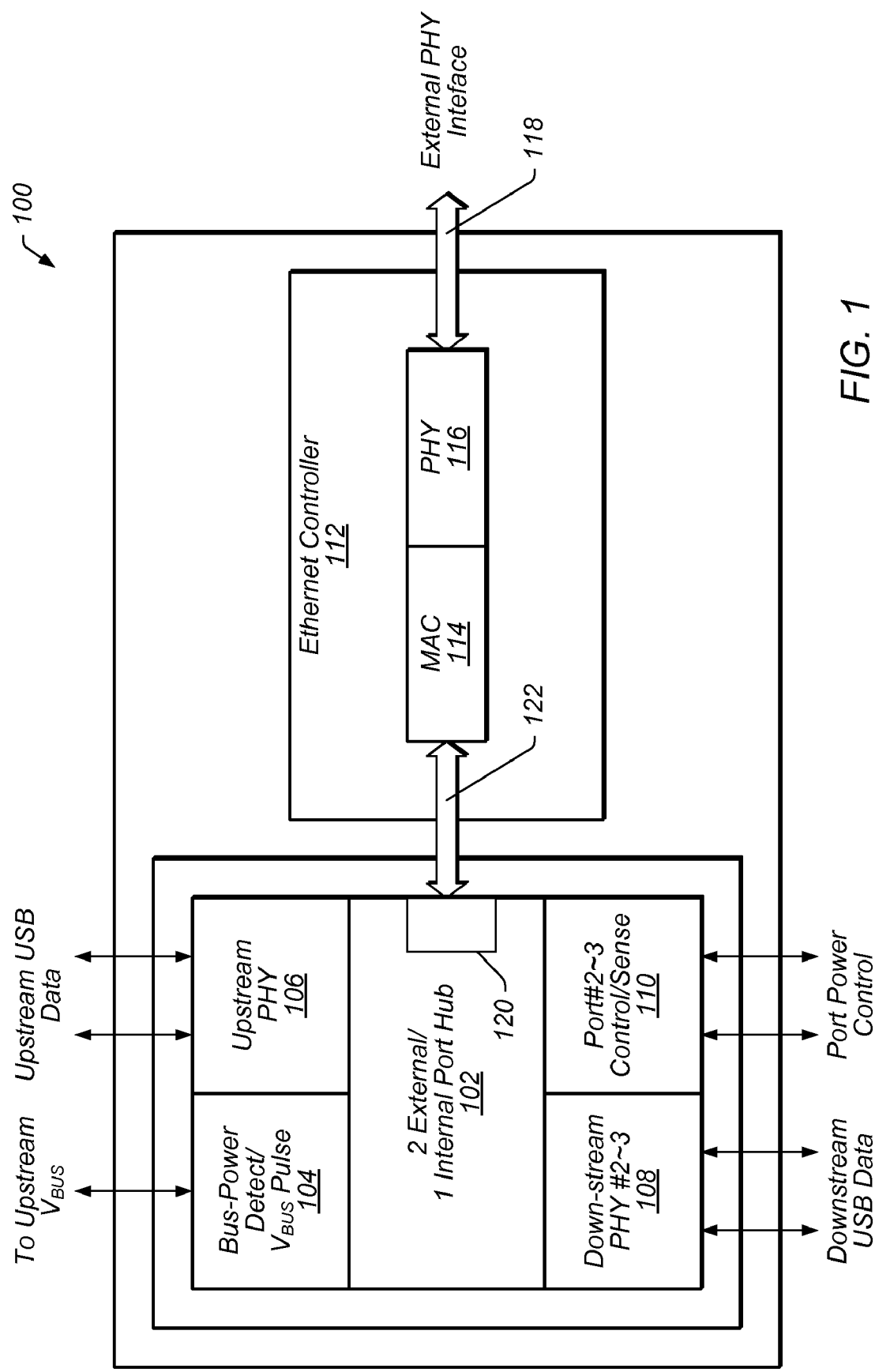
FIG. 1 shows a high-level block diagram of an integrated Ethernet controller/USB hub device, according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

A USB-to-Ethernet controller and a USB hub may be integrated into a single module 100 as shown in FIG. 1. In one set of embodiments, module 100 may be an integrated circuit (IC) chip 100, which may provide an end user with an Ethernet interface (port) 118 and multiple downstream USB ports 108. An upstream port 106 may also be provided to connect to a USB host controller. The Ethernet/USB combo IC (chip) 100 may thereby provide a single-chip solution that includes Ethernet connectivity and USB hub functionality, without requiring a printed circuit board configured with multiple chips.

FIG. 1 illustrates one embodiment of a single IC 100 comprising a combined USB hub 102 and Ethernet controller device 112. In the embodiment shown in FIG. 1, two of the downstream ports of the USB hub may be external ports, i.e. ports brought off chip via respective physical layers (PHYs) 108, to allow an end user to connect them to any arbitrary USB device(s). A third port of the USB hub may be an internal downstream port 120, configured without a PHY, and further configured to connect to an Ethernet controller 112. The IC 100 may also include a USB device controller, which may be designed into the Ethernet controller 112 in some embodiments. The Ethernet controller 112 may connect to the USB hub 102 via a digital interface 122, such as USB transceiver Macrocell Interface (UTMI). It should be noted that while various embodiments herein mention UTMI as the primary means by which the Ethernet controller 112 may couple to the USB hub 102, other embodiments may accomplish the same coupling by way of another digital interface, which may be any one of many available digital interfaces that are configurable to couple Ethernet controller 112 to USB hub 102 without requiring a PHY. Digital interface 122 is meant to represent any and all such digital interfaces.

To a host computer coupled to IC 100 (via the upstream port 106, for example) the IC 100 may appear as two separate devices attached to the host. The Ethernet controller 112 may appear to the host as a permanently attached [USB] device on the internal downstream port 120 of the USB hub. In one set of embodiments, an upstream USB PHY 106, two downstream USB PHYs 108 and 110, and an Ethernet PHY 116 may be integrated onto IC 100 as shown in FIG. 1. Additionally, one or more PLLs and voltage regulators may also be configured on IC 100, allowing for significant reduction of the BOM (bill of materials). The one or more PLLs may be configured to provide respective clock signals to the USB hub 102 and the Ethernet controller 112, which may be used to properly clock the USB hub 102 and the Ethernet controller 112. In one embodiment, to further optimize IC 100, PLL functionality that may be required by both the USB PHY (106 and 108) and the Ethernet PHY 116 may be integrated on IC 100 as a single PLL, configured to use a single crystal oscillator. The crystal oscillator may be configured to generate a periodic signal used by the PLL to generate the respective clock signals for the USB hub 102 and the Ethernet controller 112. By combining an Ethernet controller 112 and USB hub 102 into a single chip, an unprecedented reduction in final system cost and power consumption may thereby be achieved.

In a two-chip implementation, the Ethernet controller would have to be configured to connect to the USB hub via the USB DP/DM interface. In various embodiments of the single IC implementation, exemplified by the embodiment IC 100 shown in FIG. 1, the Ethernet controller 112 may be configured to connect to the USB hub 102 via a digital interface, such as a UTMI for example, which may result in the elimination of two USB PHYs, one of which would have to be included in the USB device controller (which may be comprised in the Ethernet controller), and the other one of which would have to be included in the downstream port of the USB hub, in a multiple-chip implementation. Eliminating the two PHYs may result in greatly reduced cost and power consumption. As also previously mentioned, in a multiple-chip solution, at least two crystals would be required for generating the respective clocks for the USB hub and the Ethernet controller. For example, a 25 MHz crystal may be required for the Ethernet Controller and a 12 (24) MHz crystal may be required for the USB hub. In contrast, embodiments of IC 100, which is disclosed herein, may only require a single crystal for all Ethernet, USB, and system clocks. In one embodiment, a 25 MHz crystal may be used. By only using a single crystal, silicon area may be conserved, and the BOM further reduced.

Figure 2:
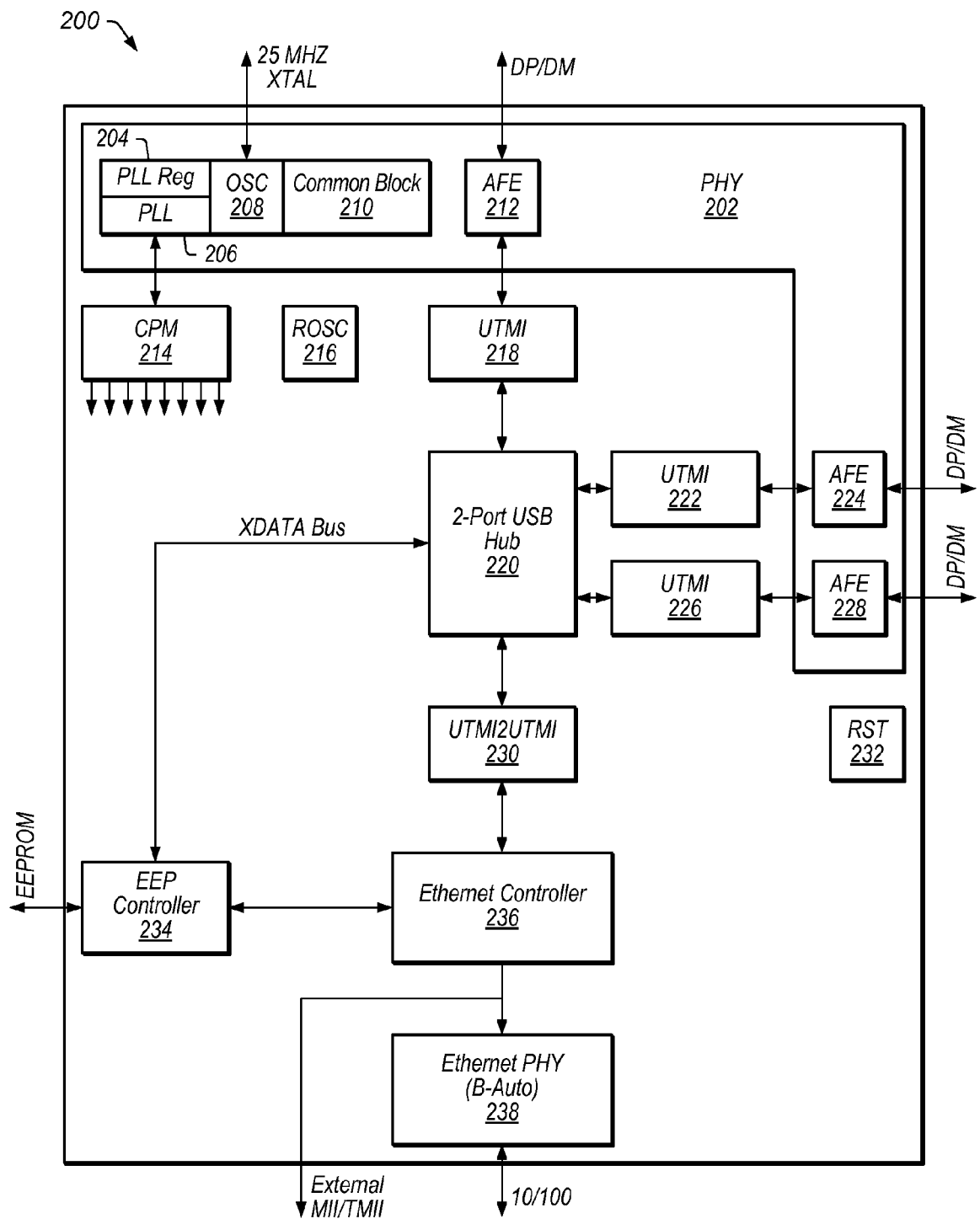
FIG. 2 shows a functional block diagram of an integrated circuit (IC) combining a USB hub and an Ethernet controller, according to one embodiment of the present invention.

FIG. 2 shows a more detailed logic diagram of one embodiment of a single IC 200 comprising a USB hub 220 with a built-in Ethernet controller 236. In this embodiment, a USB hub core 220 may be coupled to an Ethernet controller 236 via a digital interface, such as UTMI2UTMI 230 shown. As previously mentioned, interface 230 may be a digital interface different from a UTMI2UTMI, including any digital interface configurable to couple USB hub 220 to Ethernet controller 236 without requiring a PHY. A PHY block 202 may be configured on IC 200 as shown, with two USB downstream ports 224 and 228 available as DP/DM pins on IC 200, and a USB upstream port 212 also available to couple to an external host device. In one set of embodiments, USB hub 220 may comprise the USB link layer coupled to the respective physical layer elements via respective UTMI elements 222, 226, and 218 as shown. In alternate embodiments, the UTMI elements 222, 226, and 218 may also be replaced with alternate suitable interconnect/interface elements capable of interfacing USB link layer to USB PHY.

As also illustrated in FIG. 2, a PHY 238 for Ethernet controller 236 may also be integrated on IC 200, providing for an Ethernet port 238, thereby allowing data to be received from and/or transmitted to a network. IC 200 may therefore be used to facilitate data transfer between a network (coupled to PHY 238) and a host (coupled to AFE 212). When coupling to a host (via AFE 212), Ethernet controller 236 may appear to the host as being hardwired to a specified port of the USB hub 220, i.e. to the internal port of USB hub 220, which is coupled to Ethernet Controller 236 via digital interface (e.g. UTMI2UTMI) 230. The remaining two ports, coupled respectively to AFE 224 and AFE 228 via digital interfaces 222 and 226 (which may be UTMI, as shown) may serve as downstream USB ports.

PHY 202 may also incorporate the clock signal generating element or elements required by the various components configured on IC 200. In one set of embodiments, the input clock for IC 200 may be a crystal or oscillator 208. In one embodiment, the crystal frequency is 25 MHz. A single PLL 206 may be used to generate all clocking signals. A clock reference having a frequency commensurate with that of oscillator 208 may also be provided to Ethernet PHY 238. The clocks for USB hub 220 and Ethernet controller 236 may be sourced from a single clock control block CPM 214. Ethernet controller 236 and USB hub 220 may both be configured with their own clock distribution systems. PLL 206 may be operational if either one or both USB hub 220 and Ethernet controller 236 require it. In one set of embodiments, PLL 206 and/or crystal oscillator 208 may be turned off if neither USB hub 220 not Ethernet controller 236 require PLL 206 and/or crystal oscillator 208 to be operational. If PLL 206 is turned off, any wake-up event in USB hub 220 or Ethernet controller 236 may result in starting PLL 206.

In one set of embodiments, the following procedure may be used to engage PLL 206 after a USB wakeup event occurs:

1. The oscillator crystal may be automatically started by the hardware
2. The system clock source may be set to the oscillator crystal
3. The crystal oscillator 208 may be enabled and the PLL 206 may be started
4. Hardware may wait for the PLL 206 to lock
5. Once the PLL 206 is locked, the system clock may be switched to the PLL 206. IC 200 may also include an EPROM controller 234 configured to possibly obtain configuration data that may be stored in and external EPROM.

By integrating the Ethernet controller (as shown in FIGS. 1 and 2, for example), various USB hub functions of USB hub 220 may be intertwined with Ethernet controller 236. For example, IC 200 may be designed such that both USB hub 220 and Ethernet controller 236 fully support a normal USB suspend mode. For example, IC 200 may be configured such that Ethernet controller 236 drops into a very low power state while in suspend mode to allow for minimal power consumption. In one set of embodiments, Ethernet controller 236 may be configured to operate at the same speed as the upstream port 212 of USB hub 220. The internal mechanism may be configured such that the HS "chirp" speed negotiation mechanism is emulated, and is effective.

Figure 3:
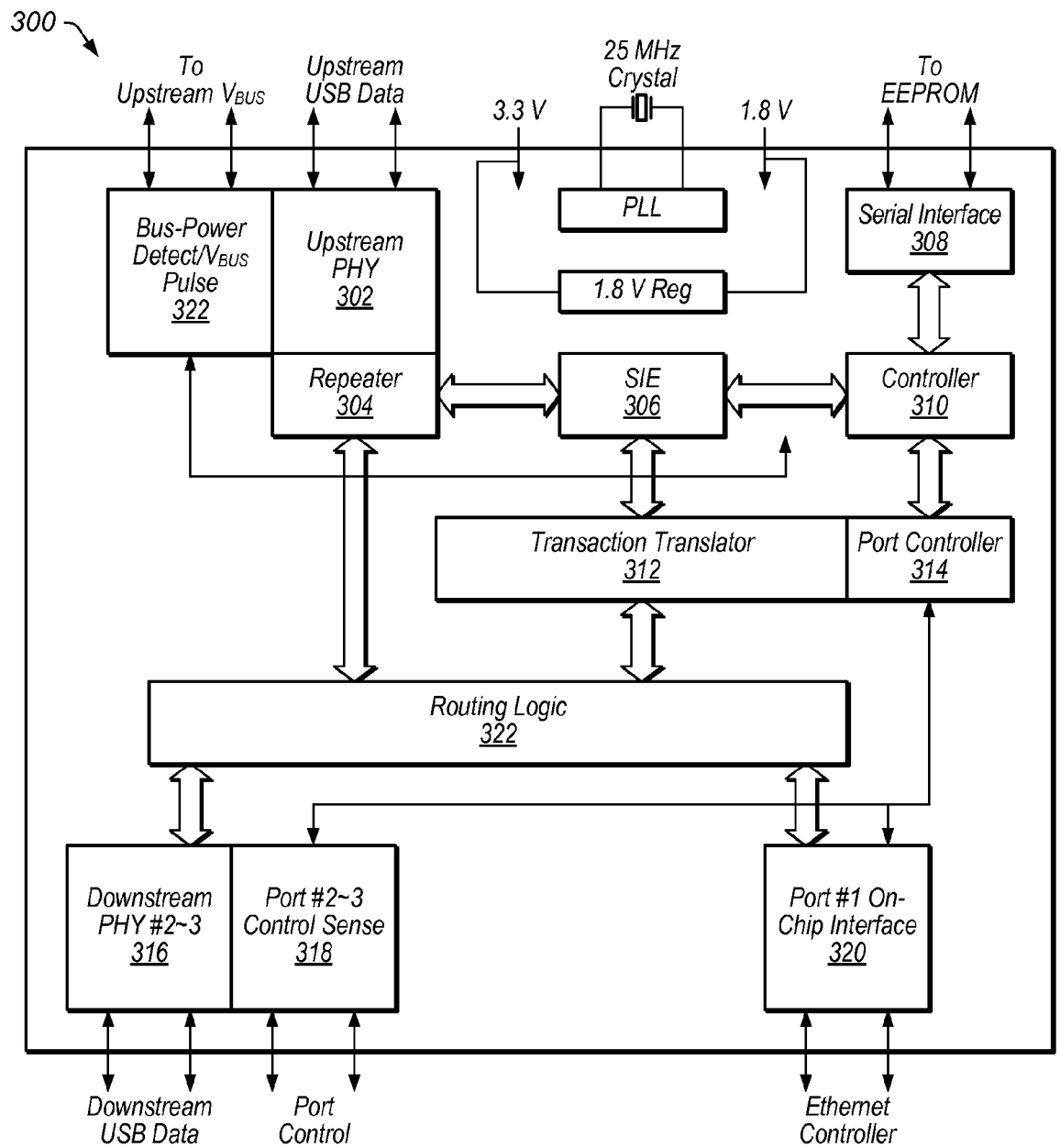
FIG. 3 shows a block diagram of one embodiment of the USB hub presented in FIG. 1 and FIG. 2.

FIG. 3 shows one possible embodiment 300 of USB hub 220. In one set of embodiments, the PLL (and crystal) shown in FIG. 3 may be omitted, and their functionality may be provided by PLL 206 shown in FIG. 2 as described above. Also, as previously described, the upstream and downstream PHYs (302, 316) may be implemented in PHY 202 as shown in FIG. 2. As shown in FIG. 3, the first downstream port 320 of the USB hub may be used to couple Ethernet controller 236 (shown in FIG. 2), via an interface comprised on IC 200. Bus-power detection for the USB hub may be implemented in module 322. Hub repeater 304 may be coupled between the upstream PHY 302 and routing logic 322, as well as to the Serial Interface Engine (SIE) 306. Serial interface 308 may communicate with an external EPROM, and provide control information to controller 310, which may interface with SIE 306 configured to run the given USB protocol (e.g. USB 2.0 protocol) for USB hub 300. The transaction translator 312 may be configured to access the downstream ports 316 and 320, via routing logic 322. Control of downstream ports 316 and 320 may be handled by port controller 314, which may operate in concert with control sense circuit 318 for controlling the external downstream ports of USB hub 300.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:
1. A system comprising:
a USB (Universal Serial Bus) hub;
an Ethernet controller;
a digital interface coupling the USB hub to the Ethernet controller to manage data traffic between the USB hub and the Ethernet controller;
a crystal configured to generate a periodic signal; and
control circuitry configured to generate, based on the periodic signal, a first clock signal and a second clock signal;
wherein the Ethernet controller is configured to be clocked by the first clock signal, and the USB hub is configured to be clocked by the second clock signal.

2. The system of claim 1, wherein the USB hub comprises an internal downstream port without a physical layer (PHY), the Ethernet controller comprises a MAC (Media Access Control) module, and wherein the digital interface is configured to couple the internal downstream port of the USB hub to the MAC module of the Ethernet controller.

3. The system of claim 1, wherein the digital interface comprises one or more of:

a USB device controller configured to manage data traffic between the USB hub and the Ethernet controller; or
a USB Transceiver Macrocell Interface (UTMI) configured to provide a digital bus connection between the Ethernet controller and the USB hub.

4. The system of claim 1, wherein the USB hub comprises at least one upstream port comprising a physical layer (PHY) configured to couple to a host.

5. The system of claim 1, wherein the Ethernet controller comprises at least one physical layer (PHY) configured to couple to a network.

6. The system of claim 1, wherein the USB hub comprises at least one downstream port with a physical layer (PHY).

7. The system of claim 1, wherein the system is configured on a single integrated circuit (IC).

8. A system comprising:
a USB (Universal Serial Bus) hub comprising an internal downstream port without a physical layer (PHY);
an Ethernet controller comprising a MAC (Media Access Control) module, and configured to transmit/receive Ethernet packets to/from a network;
a digital interface configured to connect the MAC module of the Ethernet controller to the internal downstream port of the USB hub, and configured to transmit/receive first data corresponding to the Ethernet packets to/from the USB hub;
wherein the USB hub is configured to transmit/receive the first data to/from a host.

9. The system of claim 8, wherein the USB hub further comprises at least one external downstream port having a PHY configured to couple to a device, wherein the USB hub is further configured to transmit/receive the first data to/from the device via the at least one external downstream port.

10. The system of claim 8, wherein the USB hub comprises an upstream port with a PHY configured to couple to the host, wherein the USB hub is configured to transmit/receive the first data to/from the host via the upstream port.

11. The system of claim 8, wherein the USB hub comprises a plurality of downstream ports, wherein at least a subset of the plurality of downstream ports have respective PHYs configured to couple to respective devices.

12. The system of claim 8, wherein the Ethernet controller appears to the host as a permanently attached device on the internal downstream port of the USB hub.

13. The system of claim 8, wherein the Ethernet controller comprises a PHY configured to couple to the network.

14. The system of claim 8, further comprising one or more phase locked loops (PLLs) configured to provide respective clock signals to the USB hub and to the Ethernet controller.

15. The system of claim 8, further comprising a first PLL configured to provide a respective clock signal to the USB hub, and a second PLL configured to provide a respective clock signal to the Ethernet controller.

16. The system of claim 15, further comprising a crystal oscillator, wherein the first PLL and the second PLL share the crystal oscillator.

17. An integrated circuit (IC) comprising:
an Ethernet controller circuit configured to transmit/receive data to/from a network;
a USB (Universal Serial Bus) hub circuit configured to transmit/receive the data to/from a host, and comprising an internal downstream port; and
a digital interface configured to couple the USB hub circuit to the Ethernet controller circuit through the internal downstream port, and configured to manage data exchange between the USB hub and the Ethernet controller;

wherein the USB hub circuit and the Ethernet controller circuit appear to the host as two separate devices.

18. The IC of claim 17, wherein the Ethernet controller appears to the host as a permanently attached device on the internal downstream port.

19. The IC of claim 17, wherein the Ethernet controller circuit comprises a MAC (Media Access Control) module, wherein the digital interface is configured to couple the USB hub circuit to the MAC module of the Ethernet controller.

20. The IC of claim 17, wherein the digital interface comprises a USB transceiver Macrocell Interface (UTMI).

21. The IC of claim 17, wherein the Ethernet controller circuit comprises a USB device controller, wherein the digital interface is configured to couple the USB device controller to the USB hub circuit.

22. The IC of claim 17, wherein the USB hub comprises at least one upstream physical layer (PHY), at least one downstream PHY, and at least one Ethernet PHY.

23. The IC of claim 17, further comprising one or more of:
one or more voltage regulators configured to provide power to the USB hub circuit, the Ethernet Controller circuit, and the digital interface;
one or more phase locked loops (PLL) configured to provide respective clock signals to the USB hub circuit, the Ethernet Controller circuit, and the digital interface.

24. The IC of claim 17, further comprising:
a crystal configured to generate a periodic signal; and
a PLL configured to generate respective clock signals for the USB hub circuit and the Ethernet controller circuit based on the periodic signal.

25. An integrated circuit (IC) comprising:
an Ethernet controller circuit configured to transmit/receive data to/from a network;
a USB (Universal Serial Bus) hub circuit configured to transmit/receive the data to/from a host, and comprising an internal downstream port; and
a digital interface configured to couple the USB hub circuit to the Ethernet controller circuit through the internal downstream port, and configured to manage data exchange between the USB hub and the Ethernet controller;
wherein the Ethernet controller appears to the host as a permanently attached device on the internal downstream port.

26. The IC of claim 25, wherein the Ethernet controller circuit comprises a MAC (Media Access Control) module, wherein the digital interface is configured to couple the USB hub circuit to the MAC module of the Ethernet controller.

27. The IC of claim 25, wherein the digital interface comprises a USB transceiver Macrocell Interface (UTMI).

28. The IC of claim 25, wherein the Ethernet controller circuit comprises a USB device controller, wherein the digital interface is configured to couple the USB device controller to the USB hub circuit.

29. The IC of claim 25, wherein the USB hub comprises at least one upstream physical layer (PHY), at least one downstream PHY, and at least one Ethernet PHY.

30. The IC of claim 25, further comprising one or more of:
one or more voltage regulators configured to provide power to the USB hub circuit, the Ethernet Controller circuit, and the digital interface;
one or more phase locked loops (PLL) configured to provide respective clock signals to the USB hub circuit, the Ethernet Controller circuit, and the digital interface.

31. The IC of claim 25, further comprising:
a crystal configured to generate a periodic signal; and
a PLL configured to generate respective clock signals for the USB hub circuit and the Ethernet controller circuit based on the periodic signal.

32. The IC of claim 25, wherein the USB hub circuit and the Ethernet controller circuit appear to the host as two separate devices.

33. An integrated circuit (IC) comprising:
an Ethernet controller circuit configured to transmit/receive data to/from a network;
a USB (Universal Serial Bus) hub circuit configured to transmit/receive the data to/from a host, and comprising an internal downstream port; and
a digital interface configured to couple the USB hub circuit to the Ethernet controller circuit through the internal downstream port, and configured to manage data exchange between the USB hub and the Ethernet controller;
wherein the digital interface comprises a USB transceiver Macrocell Interface (UTMI).

34. The IC of claim 33, wherein the Ethernet controller circuit comprises a MAC (Media Access Control) module, wherein the digital interface is configured to couple the USB hub circuit to the MAC module of the Ethernet controller.

35. The IC of claim 33, wherein the Ethernet controller circuit comprises a USB device controller, wherein the digital interface is configured to couple the USB device controller to the USB hub circuit.

36. The IC of claim 33, wherein the USB hub comprises at least one upstream physical layer (PHY), at least one downstream PHY, and at least one Ethernet PHY.

37. The IC of claim 33, further comprising one or more of:
one or more voltage regulators configured to provide power to the USB hub circuit, the Ethernet Controller circuit, and the digital interface;
one or more phase locked loops (PLL) configured to provide respective clock signals to the USB hub circuit, the Ethernet Controller circuit, and the digital interface.

38. The IC of claim 33, further comprising:
a crystal configured to generate a periodic signal; and
a PLL configured to generate respective clock signals for the USB hub circuit and the Ethernet controller circuit based on the periodic signal.

39. An integrated circuit (IC) comprising:
an Ethernet controller circuit configured to transmit/receive data to/from a network;
a USB (Universal Serial Bus) hub circuit configured to transmit/receive the data to/from a host, and comprising an internal downstream port; and
a digital interface configured to couple the USB hub circuit to the Ethernet controller circuit through the internal downstream port, and configured to manage data exchange between the USB hub and the Ethernet controller;
wherein the Ethernet controller circuit comprises a USB device controller, wherein the digital interface is configured to couple the USB device controller to the USB hub circuit.

40. The IC of claim 39, wherein the USB hub comprises at least one upstream physical layer (PHY), at least one downstream PHY, and at least one Ethernet PHY.

41. The IC of claim 39, further comprising one or more of:
one or more voltage regulators configured to provide power to the USB hub circuit, the Ethernet Controller circuit, and the digital interface;

one or more phase locked loops (PLL) configured to provide respective clock signals to the USB hub circuit, the Ethernet Controller circuit, and the digital interface.

42. The IC of claim 39, further comprising:
a crystal configured to generate a periodic signal; and
a PLL configured to generate respective clock signals for the USB hub circuit and the Ethernet controller circuit based on the periodic signal.

43. The IC of claim 39, wherein the Ethernet controller circuit comprises a MAC (Media Access Control) module, wherein the digital interface is configured to couple the USB hub circuit to the MAC module of the Ethernet controller.

44. An integrated circuit (IC) comprising:
an Ethernet controller circuit configured to transmit/receive data to/from a network;
a USB (Universal Serial Bus) hub circuit configured to transmit/receive the data to/from a host, and comprising an internal downstream port; and
a digital interface configured to couple the USB hub circuit to the Ethernet controller circuit through the internal downstream port, and configured to manage data exchange between the USB hub and the Ethernet controller;
wherein the USB hub comprises at least one upstream physical layer (PHY), at least one downstream PHY, and at least one Ethernet PHY.

45. The IC of claim 44, wherein the Ethernet controller circuit comprises a MAC (Media Access Control) module, wherein the digital interface is configured to couple the USB hub circuit to the MAC module of the Ethernet controller.

46. The IC of claim 44, further comprising one or more of:
one or more voltage regulators configured to provide power to the USB hub circuit, the Ethernet Controller circuit, and the digital interface;
one or more phase locked loops (PLL) configured to provide respective clock signals to the USB hub circuit, the Ethernet Controller circuit, and the digital interface.

47. The IC of claim 44, further comprising:
a crystal configured to generate a periodic signal; and
a PLL configured to generate respective clock signals for the USB hub circuit and the Ethernet controller circuit based on the periodic signal.

48. An integrated circuit (IC) comprising:
an Ethernet controller circuit configured to transmit/receive data to/from a network;
a USB (Universal Serial Bus) hub circuit configured to transmit/receive the data to/from a host, and comprising an internal downstream port;
a digital interface configured to couple the USB hub circuit to the Ethernet controller circuit through the internal downstream port, and configured to manage data exchange between the USB hub and the Ethernet controller; and
one or more of:
one or more voltage regulators configured to provide power to the USB hub circuit, the Ethernet Controller circuit, and the digital interface;
one or more phase locked loops (PLL) configured to provide respective clock signals to the USB hub circuit, the Ethernet Controller circuit, and the digital interface.

49. The IC of claim 48, wherein the Ethernet controller circuit comprises a MAC (Media Access Control) module, wherein the digital interface is configured to couple the USB hub circuit to the MAC module of the Ethernet controller.

50. The IC of claim 48, further comprising:
a crystal configured to generate a periodic signal; and
a PLL configured to generate respective clock signals for the USB hub circuit and the Ethernet controller circuit based on the periodic signal.

51. An integrated circuit (IC) comprising:
an Ethernet controller circuit configured to transmit/receive data to/from a network;
a USB (Universal Serial Bus) hub circuit configured to transmit/receive the data to/from a host, and comprising an internal downstream port;
a digital interface configured to couple the USB hub circuit to the Ethernet controller circuit through the internal downstream port, and configured to manage data exchange between the USB hub and the Ethernet controller;
a crystal configured to generate a periodic signal; and
a PLL configured to generate respective clock signals for the USB hub circuit and the Ethernet controller circuit based on the periodic signal.

52. The IC of claim 51, wherein the Ethernet controller circuit comprises a MAC (Media Access Control) module, wherein the digital interface is configured to couple the USB hub circuit to the MAC module of the Ethernet controller.

* * * * *